Oct. 14, 1958　　　M. P. WHITE ET AL　　　2,856,591
SWITCHING DEVICES

Filed Aug. 15, 1956　　　　　　　　　　　3 Sheets-Sheet 1

WITNESSES
Wm. B. Sellers.
Leon M. Garman

INVENTORS
Marshall P. White and
Charles J. Mahler.
BY
ATTORNEY

Oct. 14, 1958  M. P. WHITE ET AL  2,856,591
SWITCHING DEVICES

Filed Aug. 15, 1956  3 Sheets-Sheet 2

United States Patent Office 2,856,591
Patented Oct. 14, 1958

2,856,591

SWITCHING DEVICES

Marshall P. White, Cheektowaga, and Charles J. Mahler, Buffalo, N. Y., assignors to Westinghouse Electric Corporation, East Pittsburgh, Pa., a corporation of Pennsylvania Application August 15, 1956, Serial No. 604,180

7 Claims. (Cl. 336—110)

Our invention relates, generally, to switching devices and, more particularly, to devices in which saturable reactors are utilized for switching purposes.

An object of our invention is to control the output of a switching system by means of a saturable reactor.

Another object of our invention is to vary the saturation of a reactor by means of a movable magnet.

Still another object of our invention is to provide a contactless limit switch of the saturable reactor type.

A still further object of our invention is to provide a snap-action contactless limit switch which performs the switching operation with a high degree of accuracy with reference to movement of the actuating arm of the switch.

A more general object of our invention is to provide a contactless switching device which shall be simple and efficient in operation and which may be economically manufactured and installed.

Other objects of our invention will be explained fully hereinafter or will be apparent to those skilled in the art.

In accordance with one embodiment of our invention, the core of a saturable reactor is mounted between two pole pieces of magnetic material. The coils of the reactor are on two legs of the core and are connected in series with an alternating-current source and a rectifier. A load circuit is connected across the direct-current terminals of the rectifier. A quick-acting mechanism moves a permanent magnet from a position out of the magnetic circuit for the core to a position in the magnetic circuit, thereby saturating the core and permitting current to flow through the coils and the rectifier to the load circuit.

For a better understanding of the nature and objects of the invention, reference may be had to the following detailed description, taken in conjunction with the accompanying drawings, in which.

Figure 5:
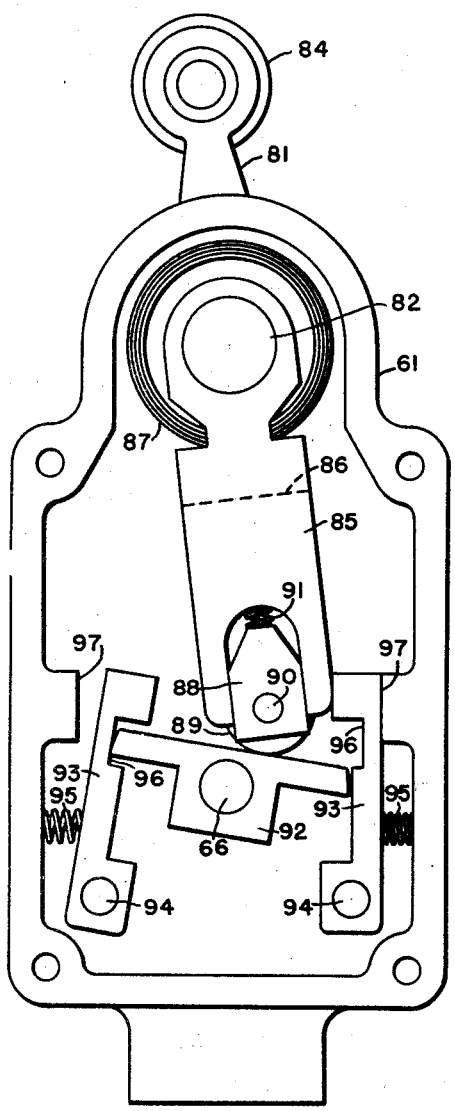
Fig. 5 is a view, in rear elevation, of the switching device showing the actuating mechanism in the alternate position from the position of the magnet shown in Figs. 1 to 4.

Referring to the drawings, the switching device shown in Figs. 1 to 5, inclusive, comprises a housing 61 preferably composed of non-magnetic material and containing a reactor assembly 62, a magnetic keeper assembly 63, a magnet arm assembly 64 and a terminal board assembly 65 in one compartment of the housing. A quick acting mechanism, which may be of a type similar to the one described in Patent No. 2,270,951, or any other suitable mechanism having a snap action, may be disposed in another compartment of the housing 61 as shown in Fig. 5. The quick acting mechanism, which will be described more fully hereinafter, is utilized to actuate a shaft 66 to which the magnet arm assembly 64 is attached.

Figure 1:
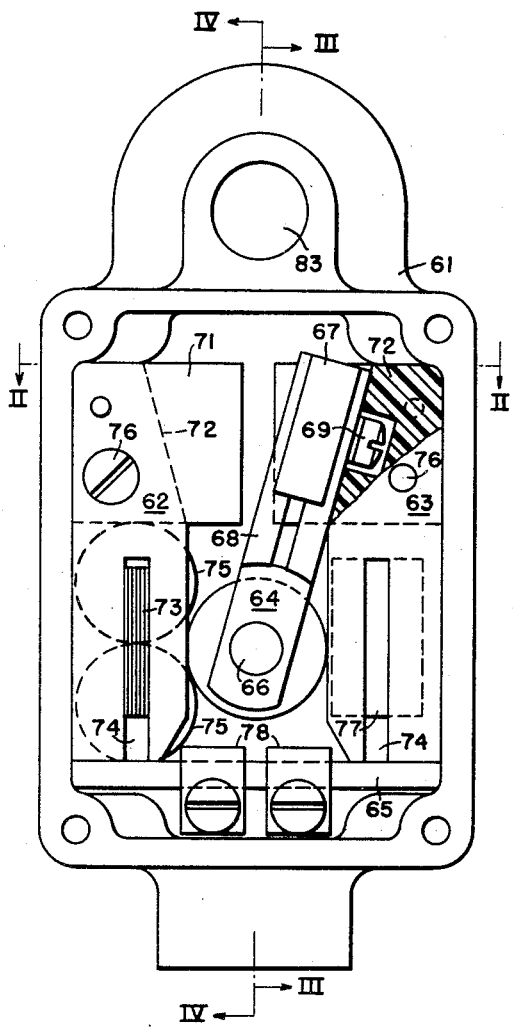
Figure 1 is a view, in front elevation, of a switching device constructed in accordance with our invention.
Figure 2:
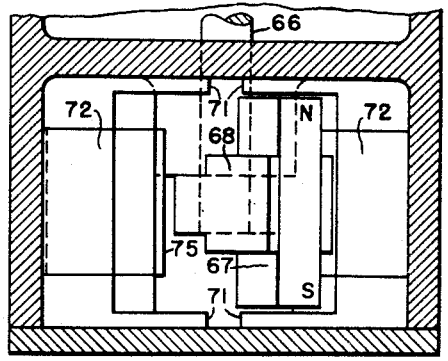
Fig. 2 is a view, in section, taken along the line II—II in Fig. 1.
Figure 3:
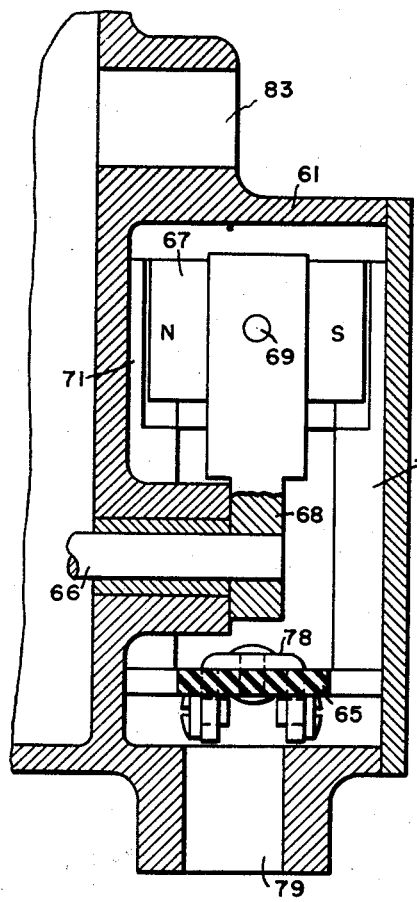
Figs. 3 and 4 are views, in section, taken along the lines III—III and IV—IV, respectively, in Fig. 1.
Figure 4:
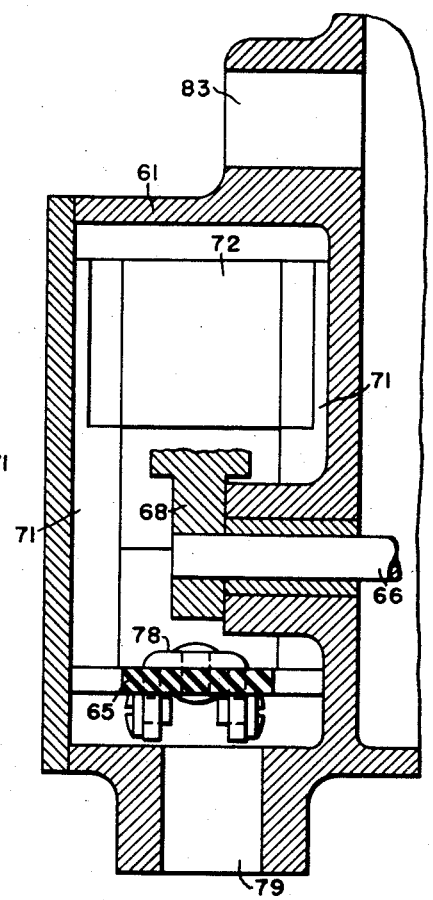

The magnet arm assembly 64 comprises a permanent magnet 67 which is attached to a bifurcated arm 68 by means of a screw 69. The arm 68 is secured to the shaft 66. As shown in Figs. 1, 2 and 3, the magnet 67 is a rectangular bar.

The reactor assembly 62 comprises two spaced, L-shaped pole pieces 71 which are disposed at opposite ends of a stop member 72 composed of non-magnetic material, preferably of nylon or of a fibrous nature. A two-legged reactor core 73 composed of a plurality of laminations of magnetic material is disposed in grooves 74 provided in the lower ends of the pole pieces 71. A coil 75 is disposed on each leg of the reactor core 73 between the pole pieces 71. The pole pieces 71 may be attached to the stop member 72 by screws 76. The stop member also functions as a spacing member for the pole pieces.

The magnetic keeper assembly 63 is utilized to shunt the flux of the magnet away from the reactor when the switch is in the "off" position. The keeper assembly comprises two pole pieces 71, a stop member 72 composed of non-magnetic material and a shunting bar 77 which is composed of magnetic material and is disposed in grooves 74 in the pole pieces in a manner similar to the core 73. The pole pieces and the stop member for the keeper assembly are similar to the corresponding members for the reactor assembly.

The terminal board assembly 65 has terminal connectors 78 attached to the board 65. The terminal connectors may be utilized for making electrical connections to the switching device. The wires for making the connections may be brought into the housing 61 through an opening 79.

The actuating mechanism shown in Fig. 5 comprises an operating arm 81 having one end secured to the outer end of a shaft 82 which extends through an opening 83 in the housing 61. A roller 84 is mounted within a yoke formed on the other end of the arm 81. The roller 84 may be engaged by a moving part of the machine or apparatus to which the housing 61 may be attached.

A lever 85 is rotatably mounted on the inner end of the shaft 82. Another lever 86 is secured to the shaft 82 behind the lever 85. The ends of a torsion spring 87, which is generally of a C-shape, so engage both of these levers that the lever 86 which is secured to the shaft 82 resiliently drives the lever 85 through the spring 87.

As shown, a member 88 is slidably disposed in the lower end of the lever 85. A roller 89 is mounted on a pin 90 in the member 88. A spring 91 biases the member 88 and the roller 89 downwardly against a rocking member 92 secured to end of the shaft 66 opposite the end to which the magnet arm 68 is secured. Latch members 93 are pivotally mounted at opposite ends of the rocker 92 on pins 94. Each latch 93 is biased towards the rocker 92 by a spring 95. A notch 96 is provided in each latch 93 for receiving the end of the rocker 92.

When the arm 81 is actuated the shaft 82 and the lever 86 are rotated, thereby driving the arm 85 through the spring 87. The roller 89 moves to the left in Fig. 5 across the rocker 92 past the pivot point of the rocker. However, the rocker can move only slightly until the lever 85 actuates the latch 93 against a stop 97 on the side of the housing 61, thereby disengaging the left end of the rocker 92 from the bottom of the notch 96 in the latch 93. When the rocker is disengaged from the latch the spring 91 causes the roller 89 to actuate the left end of the rocker downwardly with a snap action, thereby rotating the shaft 66 and actuating the magnet assembly. The right-hand end of the rocker 92 is now engaged by the right-hand latch 93 and remains so engaged until the arm 81 is actuated in the opposite direction.

When the magnet arm assembly 64 is in the position shown in the drawings and is disposed between the pole pieces 71 of the keeper assembly the flux from the magnet is shunted through the shunting bar 77 of the keeper assembly. Therefore, the reactor has a high impedance and there is no output through the switching circuit.

The magnet can be snapped to the "on" position by the mechanical snap mechanism as previously described. In this case the magnet arm has moved over against the stop member 72 of the reactor assembly placing the magnet 67 between the pole pieces 71 of the reactor assembly. Thus, the magnet aids the coils 75 in saturating the reactor core 73. The output through the switching device is at a maximum when the magnet 67 is between the pole pieces 71 of the reactor assembly.

Figure 6:
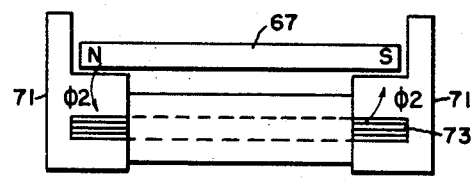
Fig. 6 is a detailed view showing the magnet in position to saturate the core of the reactor.
Figure 7:
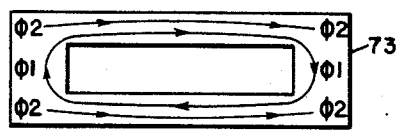
Fig. 7 is a diagrammatic view showing the distribution of flux in the core of the reactor.

When the magnet 67 is between the pole pieces 71, as shown in Fig. 6, it sets up a flux $\phi 2$. This flux will saturate the reactor core. As shown in Fig. 7 the coils 75, which are connected in series-circuit relation, produce a flux $\phi 1$. During any half cycle $\phi 2$ will oppose $\phi 1$ in one leg of the reactor and aid it in the other leg. Since the one leg of the reactor is saturated there is only a small voltage drop across the reactor and most of the applied voltage appears across the load circuit.

Figure 8:
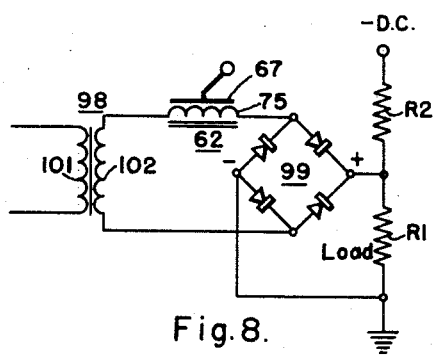
Fig. 8 is a diagrammatic view of a switching system utilizing a switching device of the type herein described.

The electrical circuit shown in Fig. 8 is similar to the one described and claimed in a copending application of R. B. Immel and M. P. White, Serial No. 606,169, filed August 24, 1956. Briefly, the system comprises a transformer 98, a full-wave rectifier assembly 99 and the reactor assembly 62. The transformer has a primary winding 101 which may be connected to an alternating current power source. The transformer also has a secondary winding 102, one terminal of which is connected to one of the alternating current terminals of the rectifier 99. The other terminal of the secondary winding 102 is connected to the other alternating current terminal of the rectifier in series with the two coils 75 of the reactor 62.

A load, which is represented by a resistor R1, is connected across the direct current terminals of the rectifier 99. A resistor R2, one terminal of which is connected to the negative potential of a separate source of direct current, is utilized to provide a by-pass circuit for the exciting current of the reactor. The positive connection may be made at ground which is also connected to the negative terminal of the rectifier bridge. Thus, the exciting current does not flow through the load circuit.

Since the magnet 67 is actuated with a quick action to control the voltage across the load in the manner previously explained, the accuracy of the present switch is as good or better than the accuracy of previously utilized limit switches of the contact type. Since the stop member 72 is composed of nylon or a fibrous material it functions as a cushion to prevent shock of the magnet 67. The service life of the present switch will be better than previously known switches because of the elimination of contact members which are subject to deterioration from arcing and wear.

From the foregoing description it is apparent that we have provided a contactless switching device which is simple in construction and reliable in operation. The present device is particularly suitable for utilization as a limit switch in control systems having magnetic logic elements. However, it may be utilized as a switching device in control systems of other types.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a contactless switching device, in combination, a core composed of magnetic material, a coil disposed on said core, pole pieces at opposite ends of said core providing a magnetic circuit for flux produced by the coil, a non-magnetic stop member disposed between the pole pieces, a magnet, and a quick-acting mechanism for moving said magnet from a position out of said magnetic circuit to a position engaging the stop member between said pole pieces where the flux produced by the magnet aids in saturating said core.

2. In a contactless switching device, in combination, a core composed of magnetic material, a coil disposed on said core, spaced members at opposite ends of said core providing a magnetic circuit for flux produced by the coil, a magnet, a quick-acting mechanism for moving said magnet from a position out of said magnetic circuit to a position between said spaced members thereby causing the flux produced by the magnet to aid in saturating the core, and a non-magnetic stop member disposed between said spaced members for engaging the magnet.

3. In a contactless switching device, in combination, a housing, a shaft rotatably mounted in the housing, a magnet assembly carried by the shaft, a reactor assembly disposed at one side of the shaft, a keeper assembly disposed at the opposite side of the shaft, and a quick-acting mechanism for actuating the magnet assembly from an "off" position adjacent the keeper assembly where the flux produced by the magnet is shunted through the keeper assembly to an "on" position adjacent the reactor assembly where the flux from the magnet flows through the reactor assembly to aid in saturating the reactor.

4. In a contactless switching device, in combination, a housing, a shaft rotatably mounted in the housing, a magnet assembly carried by the shaft, a reactor assembly disposed at one side of the shaft, said reactor assembly comprising a core, a coil on the core, pole pieces at opposite ends of the core, a keeper assembly disposed at the opposite side of the shaft, said keeper assembly comprising a shunting bar, pole pieces at opposite ends of the bar, and a quick-acting mechanism for actuating the magnet assembly from an "off" position adjacent the keeper assembly where the flux from the magnet is shunted through the keeper assembly to an "on" position adjacent the reactor assembly where the flux from the magnet flows through the reactor assembly to aid the coil in saturating the core.

5. In a contactless switching device, in combination, a housing, a shaft rotatably mounted in the housing, a magnet assembly carried by the shaft, a reactor assembly disposed at one side of the shaft, said reactor assembly comprising a core, a coil on the core, pole pieces at opposite ends of the core, a keeper assembly disposed at the opposite side of the shaft, said keeper assembly comprising a shunting bar, pole pieces at opposite ends of the bar, and a mechanism for actuating the magnet assembly from an "off" position between the pole pieces of the keeper assembly where the flux from the magnet is shunted through the bar to an "on" position between the pole pieces of the reactor assembly where the flux from the magnet flows through the core to aid the coil in saturating the core.

6. In a contactless switching device, in combination, a housing, a shaft rotatably mounted in the housing, a magnet assembly carried by the shaft, a reactor assembly disposed at one side of the shaft, said reactor assembly comprising a two-legged core, a coil on each leg of the core, said coils being connected in series-circuit relation, pole pieces at opposite ends of the core, a keeper assembly disposed at the opposite side of the shaft, said keeper assembly comprising a shunting bar, pole pieces at opposite ends of the bar, and a quick-acting mechanism for actuating the magnet assembly from an "off" position between the pole pieces of the keeper assembly where the flux from the magnet is shunted through the bar to an "on" position between the pole pieces of the reactor assembly where the flux from the magnet flows through the core to aid the coils in saturating the core.

7. In a contactless switching device, in combination, a rotatable shaft, a magnet assembly carried by the shaft, a reactor assembly disposed at one side of the shaft, said reactor assembly comprising a two-legged core, a coil on each leg of the core, said coils being connected in series-circuit relation, pole pieces at opposite ends of the core, a non-magnetic stop member disposed between the pole pieces, a keeper assembly disposed at the opposite side of the shaft, said keeper assembly comprising a shunting bar, pole pieces at opposite ends of the bar, a non-magnetic stop member between said pole pieces, and a mechanism for actuating the magnet assembly from a position in which the magnet engages the stop member between the pole pieces of the keeper assembly and the flux from the magnet is shunted through the bar to a position in which the magnet engages the stop member between the pole pieces of the reactor and the flux from the magnet flows through the core to aid the coils in saturating the core.

References Cited in the file of this patent
UNITED STATES PATENTS 2,736,869    Rex _____ Feb. 28, 1956